H. H. SMITH.
SADDLE AND POST CLAMP.
APPLICATION FILED JUNE 9, 1910.

999,897.

Patented Aug. 8, 1911.

Witnesses.
Juo O Johnson,
S H Stephens

Inventor.
Harry H. Smith

UNITED STATES PATENT OFFICE.

HARRY H. SMITH, OF JOPLIN, MISSOURI.

SADDLE AND POST CLAMP.

999,897. Specification of Letters Patent. Patented Aug. 8, 1911.

Application filed June 9, 1910. Serial No. 566,114.

*To all whom it may concern:*

Be it known that I, HARRY H. SMITH, a citizen of the United States, residing at Joplin, county of Jasper, and State of Missouri, have invented a new and useful Improvement in Saddle and Post Clamps, of which the following is a specification.

The invention has for its object to provide not only a reliable means for carrying the drill and for accommodating the type now in use, but also to provide for the adjustment or shifting of the same to various angles according to the position it may be required to cause the saddle or drill to assume; also to provide for carrying out these sundry objects in a simple, expeditious and effective manner.

The invention to these ends consists of certain instrumentalities or features substantially as hereinafter fully disclosed and defined by the claim.

Figure 2:
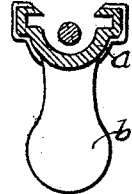
Figure 1:
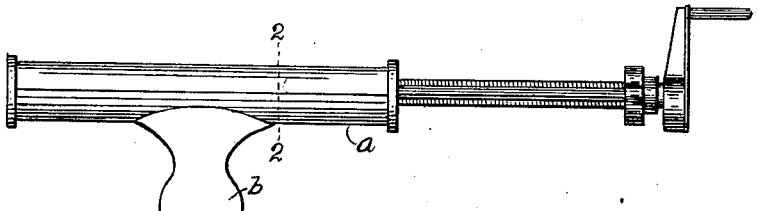
Figure 3:
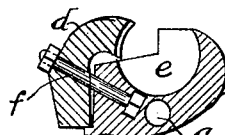
Figure 7:
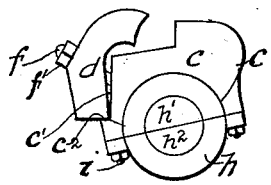
Figure 8:
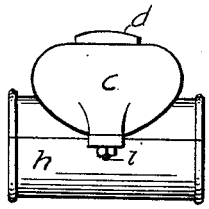
Figure 4:
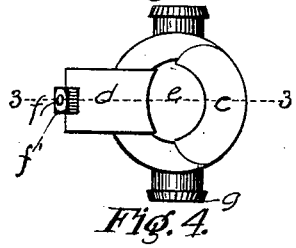
Figure 5:
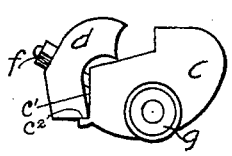
Figure 6:
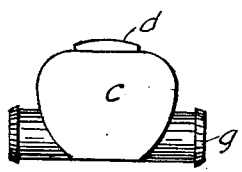

In the accompanying drawing illustrating the preferred embodiment of my invention:—Figure 1 is a side elevation of the same. Fig. 2 is a vertical section produced through Fig. 1 on the line 2—2. Fig. 3 is a like section taken through Fig. 4 on the line 3—3. Fig. 4 is a plan view of the invention. Fig. 5 is an end view of Fig. 4. Fig. 6 is a view of the device taken at right angles to Fig. 5. Fig. 7 is an end view of a modification of the invention for the adaptation or attachment of the same to what may be termed a post or arm. Fig. 8 is a side view of the modification shown in Fig. 7.

In practicing my invention, I provide the drill carriage $a$ with a central pendent extension having a ball like or spherical terminal $b$ at its lower end, received by an upwardly cupped ball socket $e$ formed in a socketed member or casting $c$ and a clamp member $d$. The member $c$ has a plane, vertical surface $c'$, which terminates in a shoulder $c^2$, and on this shoulder rests the clamp member $d$. A bolt $f$, is carried by the socket member, and extends obliquely through said plane surface and through said clamp member. A nut $f'$, on said bolt is adapted for tightening the clamp member against the ball and against the shoulder $c^2$. This latter feature is an important one; for unless the clamp member is held in rigid relation with the socket member, the ball is liable to be unstable in the socket and cause unnecessary friction, and possible breakage of the drill, and besides, requiring greater power to operate the drill. To provide for this rigid relation, the bolt is inclined to the plane of the surface $c'$, so that when the nut $f'$ is tightened, it simultaneously tightens the member $d$ against the ball and against the shoulder, so that all the parts are rigidly secured together. When it is desired to change the position of the drill, the nut $f'$ may be loosened and the ball shifted in the socket to the desired position.

The clamp $d$ together with its retaining nut-equipped bolt $f$, provides for the ready and expeditious shifting or adjustment of the ball terminated extension $b$ of the drill carriage according to the angle of adjustment it may be desired to impart to the drill-carriage as will be readily understood; also by this arrangement the saddle-carriage may be rotated as upon an axis as may be desired. The passage $g$ of the casting $c$ receives a lock-bolt, not shown, of any desired form of tripod for suitably supporting the drill-carriage together with adjunctive parts.

As suggested by Figs. 7 and 8, the device may be adapted for attachment to a post or arm, the casting or member $c$, in that event, being provided with a clamp to receive said arm or post, having a downwardly cupped semi-cylindrical aperture $h'$ therein, and having a lower member $h$ secured thereto, by means of bolts $i$. The lower clamping member is formed with a semi-cylindrical aperture $h^2$ which coincides with the aperture $h'$ and coöperates therewith for clamping onto a shaft or the like.

The device as above described is also adapted to provide for so disposing the drill-carriage as to effect the boring or drilling operation with accuracy and precision, as is apparent by reason of the nicety of adjustment of which it is susceptible.

I claim:—

In a clamping device, a socketed member comprising an upwardly cupped ball socket and a downwardly cupped semi-cylindrical aperture and a substantially vertical plane surface having a shoulder thereon and having a bolt extending obliquely upward therefrom, a ball seated in the socket and carrying a drill carriage, an upper clamp member seated on the shoulder and adapted to contact the ball for securing the ball in the socket, a lower clamping member comprising an upwardly cupped semi-cylindrical aperture and connected to the under side of the socketed member and coacting therewith for clamping the said members to a shaft, said bolt extended through the upper clamping member and having a nut thereon for securing the latter in firm contact with the ball and with the shoulder.

HARRY H. SMITH.

Witnesses:
J. O. JOHNSON,
S. H. STEPHENS.

Copies of this patent may be obtained for five cents each, by addressing the "Commissioner of Patents, Washington, D. C."